July 18, 1961

A. L. NASVYTIS 2,992,635

NUTATING DISC MOTOR

Filed April 17, 1958

Inventor
Algirdas L. Nasvytis

July 18, 1961

A. L. NASVYTIS 2,992,635

NUTATING DISC MOTOR

Filed April 17, 1958

Inventor
Algirdas L. Nasvytis by Hill, Sherman, Meroni, Gross & Simpson

Attys.

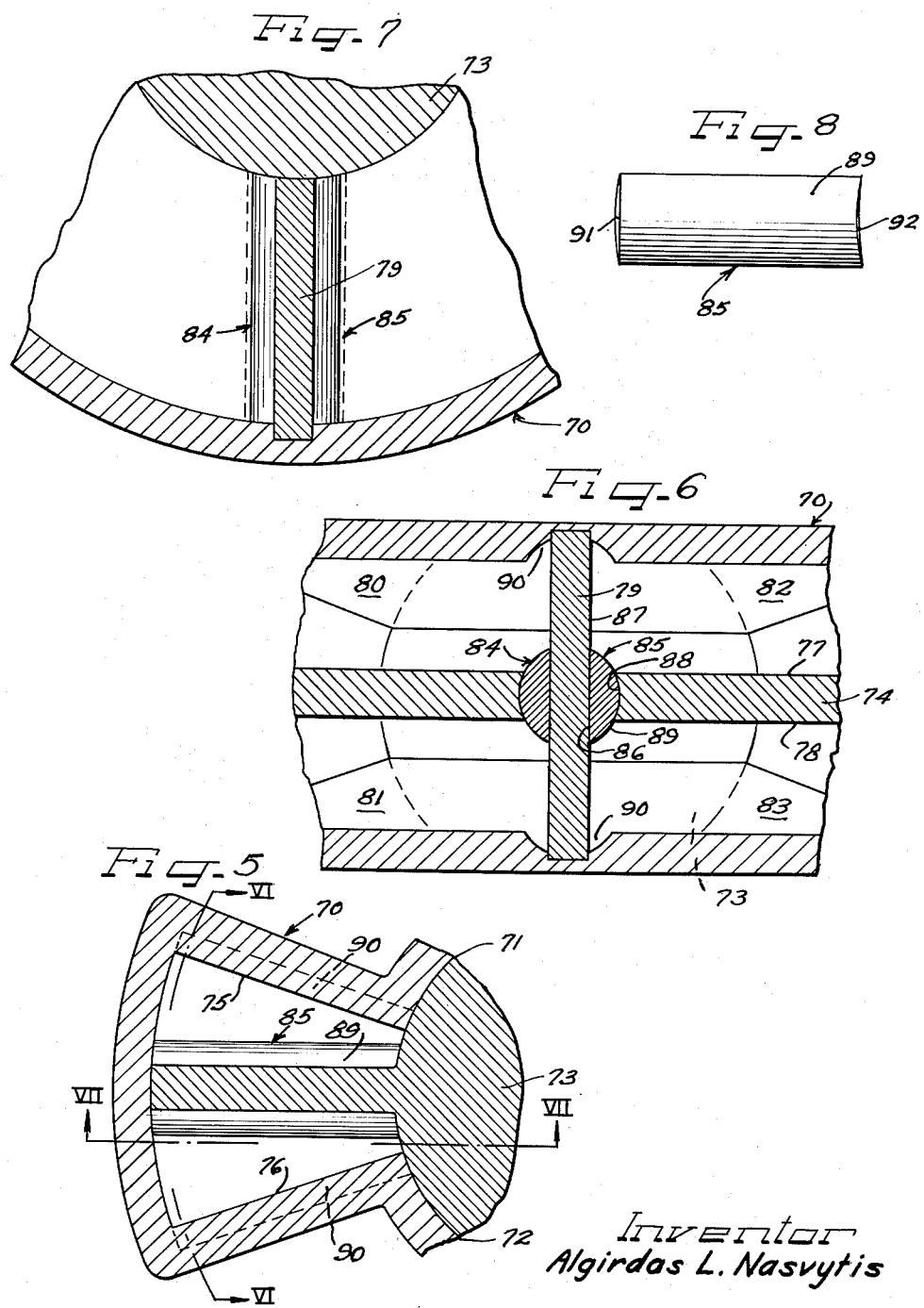

United States Patent Office 2,992,635
Patented July 18, 1961

2,992,635
NUTATING DISC MOTOR
Algirdas L. Nasvytis, Cleveland, Ohio, assignor to Thompson Ramo Wooldridge Inc., a corporation of Ohio
Filed Apr. 17, 1958, Ser. No. 729,182
16 Claims. (Cl. 121—69)

The present invention relates broadly to motors operable by expansible fluids or gases, and is more particularly concerned with a new and improved nutating disc motor compressor or pump which is driven by an expansible fluid or gas.

In a preferred form, the present invention contemplates the provision of a nutating disc motor having at least one motor chamber for containing expansible gases, and a nutating disc supported by a sphere and mounted upon a shaped seat within the chamber for wobbling or rotating movement therein when driven by expansible fluid. The shaft projects from the disc in a direction eccentric from the axis of rotation of the disc and may carry at its free end drive means to relieve the load on the divider or partition plate which is located within the motor chamber or compartment. Expansible gas is directed to the motor chamber through inlet holes in the seat which communicate alternately with inlet ports in the spherical portion of the nutating disc communicating with opposite surfaces of said disc. The partition has a high pressure side and a low pressure side, and the inlet ports in the disc sphere lead to a high pressure zone on the high pressure side. Exhaust passageways are provided which lead from both sides of the disc from the chamber from a low pressure zone on the lower pressure side of the partition. The inlet holes in the disc seat are generally arc shape, and control the length of time during which expansible gas is permitted to enter the chamber. By varying the relative length of the inlet holes in the seat, a change in inlet time can be effected and variations in motor output obtained.

To reduce the friction or rubbing forces of the disc on the divider or partition plate, which occur primarily when the disc is forced to make a relatively fast adjustment by sidewise or rotative movement in the positions when the angle of the disc to the plate is at a minimum, a gear arrangement or similar means may be provided on the outer end of the disc shaft. This may take the form of a differential gear construction in which one gear is fixed on the shaft, and by use of gears arranged in a particular manner and having specific ratios one to the other, rotation of the fixed gear about its own axis can be effectively reduced to zero.

The present invention also contemplates a nutating disc motor having a chamber divided by two separate or partition plates whereby there is created four working compartments. The inlets of two opposite working compartments viewed vertically and horizontally may then be synchronized so that the pressures on the disc sphere and seat are balanced and the pressure on the disc from opposite sides creates pure torque without reaction forces. Friction losses arising from these forces are thus effectively reduced to a marked degree. The inlets in the four chamber or compartment construction may be provided in the disc sphere and seat as in the single partition arrangement of this invention.

It is therefore an important aim of the present invention to provide an improved motor operable by an expansible fluid, and utilizing the principle of a nutating disc.

Another object of the invention is to provide an improved nutating disc motor employing adiabatic expansion of an expansible fluid for operating the motor.

Another object of this invention is to provide an improved fluid flow control for a nutating disc motor wherein a variable cut-off time for the fluid delivery is obtained to thereby vary the adiabatic expansion of the gases or fluids operating the motor.

A further object of the invention lies in the provision of a novel inlet arrangement in the disc sphere and seat for regulating the flow of expansible operating fluid to a motor employing a motor chamber with a nutating disc therein.

A further object of the invention is to provide drive means carried externally of a nutating disc motor to effectively reduce friction forces between the disc and partition plate located interiorly of the motor.

A still further object of this invention is to provide an improved nutating disc motor having a plurality of motor chambers therein and synchronized inlets and outlets for said chambers whereby the pressure forces on the disc and sphere within said chambers are balanced and friction losses markedly reduced.

Other objects and advantages of the present invention will become more apparent during the course of the following description, particularly when taken in connection with the accompanying drawings.

In the drawings, wherein like numerals are employed to designate like parts throughout the same:

FIGURE 5 is a vertical sectional view of a motor chamber construction constructed in accordance with the principles of this invention, and in which a seal member is located between the nutating disc and divider plate;

FIGURES 6 and 7 are sectional views taken essentially along the lines VI—VI and VII—VIII, respectively, of FIGURE 5; and FIGURE 8 is a detailed view of a seal member.

Figure 1:
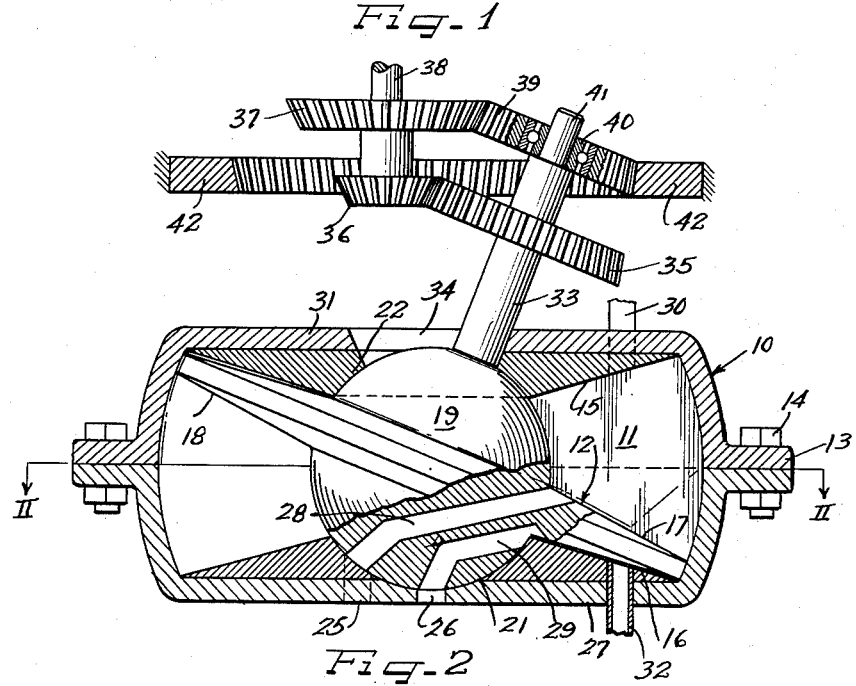
FIGURE 1 is a side elevational view, partially in section, of a motor construction embodying the principles of the present invention.

Referring now to the drawings, and first to FIGURE 1 thereof, the nutating disc motor of this invention includes a motor housing 10 with a motor chamber 11 therein. Within the chamber there is located a flat round nutating disc 12 which is positioned for nutating motion within the chamber 11. The motor housing 10 may be provided in two sections for ease of assembly, and accordingly may have circumferential flange portions 13 secured together by bolt means or the like 14.

The motor chamber 11 is preferably generally circular in plan, and provided therein are opposed, substantially conically shaped upper and lower surfaces 15 and 16 which mate with the upper and lower surfaces 17 and 18 of the disc 12 during nutation thereof within the motor chamber 11.

The disc is guided in its motion by a centrally located disc supporting sphere 19 suitably secured within a central opening (not shown) in the disc. The sphere is in turn supported in mating spherical sockets or seats 20 and 21 in the upper and lower surfaces 15 and 16, respectively.

At one side of the motor chamber 11 and extending radially outwardly from the center thereof is a divider or partition plate 22. The partition 22 has a high pressure side 24 facing a high pressure zone within the pump chamber, and a low pressure side 23 facing a low pressure zone therein. The disc 12 is of course suitably cut out to accommodate the separator member 22.

For supplying pressurized expansible fluid or gas to the chamber at the high pressure zone, a pair of connecting generally arc shape inlet openings 25 and 26 are provided in the bottom wall 27 of the housing 10 and lower seat 21, as well as inlet ports 28 and 29 in the disc sphere 19. It is to be noted, however, that separate inlet openings are required only if inlet duration is less than 180°. If the duration is more than 180°, a common inlet may be used.

The ends of said ports 28 and 29 communicate respectively with the upper and lower surfaces 15 and 16 of the disc 12 within the motor chamber 11. In operation of the disc, expansible fluid or gas under pressure is directed against one surface of the disc by passage through one of the inlet openings and inlet ports, such as through the inlet 26 and port 29 and against the disc lower surface 16, for a predetermined portion of the cycle of rotation of the disc 12. The gas is then permitted to expand for the remainder of the cycle with an adiabatic expansion. When 180° of rotation of the nutating disc has been completed, gas is passing through inlet 25 and inlet port 28 for a predetermined portion of the cycle, and this amount of gas is permitted to expand adiabatically for the completion of a cycle. As will be pointed out in more detail later, the relative length of the arc shape inlets 25 and 26 may be varied, and thereby the time period during which fluid or gas is directed to either the upper or lower surface of the disc may be varied with consequent changes in the output of the motor.

The nutating disc motor is adapted to receive various types of gases or fluids, such as air, nitrogen, products of combustion such as received from a jet engine, steam or special use products of chemical reactions, such as hydrazine, ethylene oxide and other compounds.

The disc 12 rotates with adiabatic expansion of gas, and the expanding gas is vented from within the motor housing 10. For this purpose, gas expanded against the upper surface 17 of the disc 12 is vented through an exhaust passageway 30 provided in the conical upper surface 15 and housing top wall 31, and the lower surface 18 of the disc is vented through an exhaust port 32 passing through the lower conical surface 16 and housing bottom wall 27. These exhaust passageways are always open in this embodiment of the invention so that the gas may freely escape when the disc 12 is in a position to discharge the gas through them.

While the movement of the nutating disc 12 is herein referred to as rotation for purposes of explanation, it will be understood that a true rotation or rotation about an axis is not achieved, but instead the disc moves in a nutating movement. To transform this movement into rotation, a crank pin 33 is provided which is connected at the axial center of the nutating disc and extends coaxial therewith through an opening 34 in the housing upper wall 31 so as to rotate in a conical path with the nutating movement of the disc 12. The gear arrangement shown in FIGURE 1 is not at all times required, as will be pointed out in the detailed description thereof to follow. Accordingly, to receive power from the motor, the upper end of the rotating crank pin may be suitably connected to a power shaft (not shown), and as the pin 33 is rotated the power shaft will be driven in rotation in order that power may be received from the motor.

By utilization of an inlet and inlet port arrangement substantially as disclosed herein, there is no longer required valve means and the like located exteriorly of the motor to control the flow of gas to the motor. There are no exterior control means herein provided which might be a source of malfunctions, and versatility of control in the desired frequency of nutation of the motor may be more readily obtained. Viewing FIGURE 1, fluid directed into the generally arc shape inlet 26 and through the port 29 causes said fluid to contact the lower surface 18 of the disc 12 and initiation of the nutating movement of said disc. As the fluid or gas adiabatically expands, continued rotation of the disc sphere 19 upon and against seats 20 and 21 occurs until the disc has completed essentially a 180° rotation and the fluid or gas ported through the passageway 32. Upon completion of the rotation just described, fluid or gas may be caused to flow into the inlet 25 and port 28 to effect a further 180° rotation whereupon the disc will be substantially in the position shown in FIGURE 1. Should it be desired to increase the inlet time, and accordingly effect a decrease in adiabatic expansion, the length of the arc shape inlets 25 and 26 may be increased so that the communication between inlet port 28 and inlet 25 and between port 29 and inlet 26 will be increased.

While not necessarily required in all instances, there may be provided in association with the novel nutating disc motor described, as well as with heretofore used constructions, drive means which function to relieve the load on the partition or separator plate. To explain, it has been found that the partition plate takes substantially all of the motor output torque reaction, as well as friction force reaction caused by relative slippage of the disc relative to the cones or seats. Further, the section of the disc which is cut out for the partition plate must remain as thin as possible since the maximum gap between the partition plate and disc cut is substantially proportional to the disc thickness. This gap is normally always closed from the pressure side, and the disc is therefore forced to make a very fast adjustment by sidewise or rotative motion in the positions when the angle of the disc to the plate is at a minimum. The result is that there is encountered abnormally high p.s.i. rubbing values on the partition plate.

Novel means are herein provided to substantially prevent sidewise motion or rotation of the disc, and accordingly, to relieve to a marked extent the load on the partition plate. Means of varying constructions are suitable for this purpose, and among those which function effectively are linkages, universal joints, parallelograms and differential gears.

A differential gear arrangement of relatively simple construction which requires a minimum of space is shown in FIGURE 1. As noted, there is connected at the axial center of the disc sphere 19 a crank pin 33 extending coaxially with said disc through an opening 34 in the housing top wall 31. Carried by the crank pin or shaft 33 and secured against rotation thereon is a beveled gear 35 which meshes with a relatively smaller beveled gear 36 rigidly connected with an additional beveled gear 37 carried upon a common shaft 38. Meshing with said gear 37 is a beveled gear 39 which rotates freely by means of bearing 40 on a reduced end portion 41 of the crank pin or shaft 33 in meshing engagement with a stationary internal gear 42. The latter gear 42 is attached to suitable structure as shown, and the shaft 38 is freely rotatable in structure and may constitute the power output shaft.

It is desired that the rotation of beveled gear 35 about its own axis be zero in order to substantially eliminate sidewise motion or rotation of the nutating disc 12. There are of course a number of ratios between the gears 42 and 37 and between the gears 36 and 35 which are possible in order to achieve this desired result. As for example, it may be assumed that the ratio of stationary internal gear 42 to gear 37 is two, and that the ratio of gear 36 to gear 35 is one to two. Accordingly, if the nutating disc 12 makes $n$ turns in one minute while gear 42 is stationary, and the ratio of gear 42 to gear 37 is two, then gear 37 will rotate $n$, 1+the value of $$\frac{42}{37}$$

or $3n$ times. Further, if gear 36 is stationary, and the ratio of gear 36 to gear 35 is one to two, then for each $n$ turn or rotation or the nutating disc 12, gear 35 will rotate one and one-half times $n$. However, gear 36 rotates counter-clockwise while gear 35 rotates clockwise, and accordingly gear 36 rotates $3n$. Since gear 35 has a diameter twice that of gear 36, as noted, gear 35 rotates three times $n$ divided by two in the opposite direction. The rotation or sidewise motion of gear 35 about its own axis is accordingly one and one-half times $n$ less three $n$ divided by two, or zero.

Substantially the same results may be obtained with different ratios between the gears mentioned, and it will also be appreciated that the differential gear arrangement disclosed need not be in the particular form shown in the drawings. Further, persons skilled in the art may at times find that various types of linkages or universal joints or parallelograms or other devices will be more effective under the particular conditions encountered. And while as noted, a special drive as disclosed to relieve the load on the partition plate need not necessarily be employed in the particular nutating disc motor construction shown in the drawings, it does have particular utility in high power applications. In addition, the principle of exterior drive means to relieve the partition plate load is well adapted to nutating disc motors of conventional types in which valve means are employed to control the amount of fluid admitted to the motor chamber.

Considerable investigation by applicant of the forces which work upon the nutating disc sphere and sphere seat additionally establishes that substantial reaction forces are created between said sphere and seat by reason of unbalanced pressure on the sphere and on the disc itself. In the absence of outside relief for the sphere, such as axis through ball, two way thrust bearings on the axis, or other means, the friction losses which arise due to the reaction forces are often in the range of more than 20% of the total power output. Stress, wear and heat transfer problems are encountered which frequently are of a very substantial character.

Figure 2:
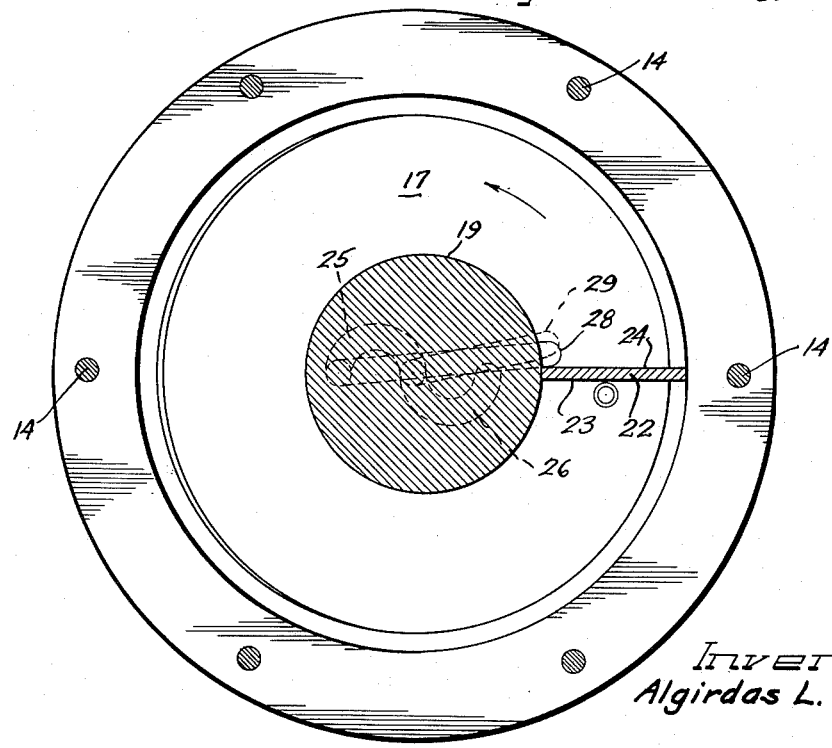
FIGURE 2 is a horizontal sectional view taken substantially along the line II—II of FIGURE 1, and showing in part the inlet port arrangement of the disc seat.
Figure 3:
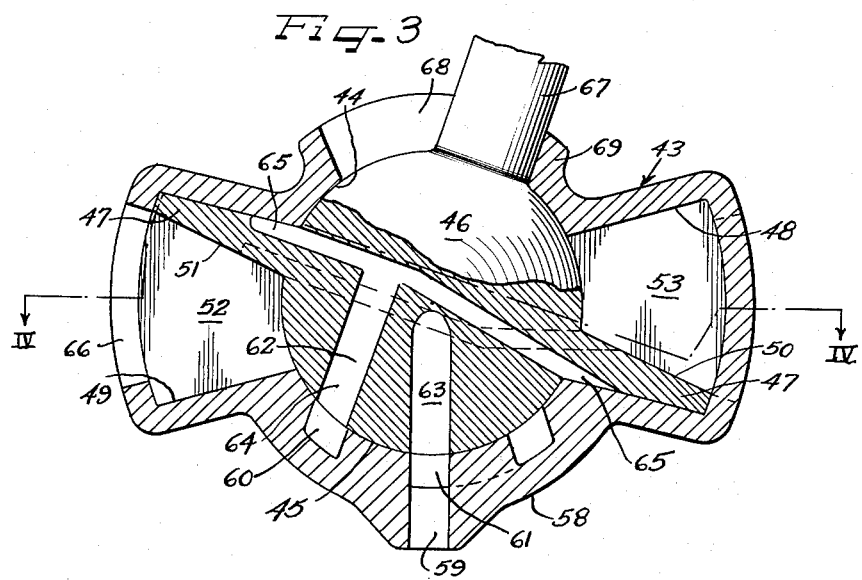
FIGURE 3 is a vertical sectional view taken through another motor construction embodying the features of this invention.
Figure 4:
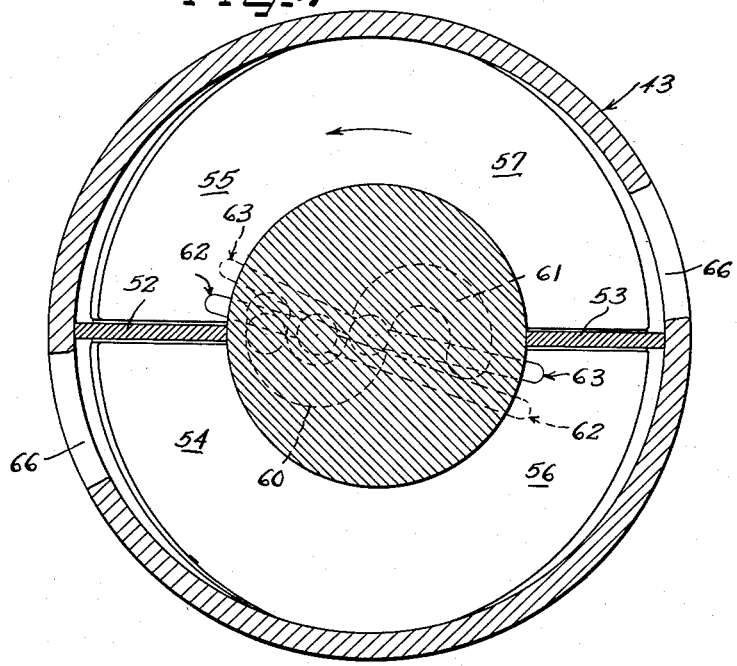
FIGURE 4 is a horizontal sectional view taken substantially along the line IV—IV of FIGURE 3, and showing the inlet arrangement of the sphere seat for a nutating disc motor having more than two chambers therein.

Applicant has discovered that in the neighborhood of 80% of the reaction forces may be effectively eliminated by the use of two partition or separator plates located on opposite sides of the disc. An arrangement of this character will now be described and is shown in FIGURES 3 and 4 in combination with an inlet and inlet port construction generally similar to that of FIGURES 1 and 2.

In this form of invention there is provided a generally circular housing 43 which is formed interiorly with spherically shaped upper and lower seating surfaces 44 and 45, respectively, supporting a sphere 46 upon which is carried a substantially circular disc 47 for nutating movement of said sphere and disc upon the surfaces 44 and 45. The housing is further shaped interiorly with upper and lower surfaces 48 and 49 which mate with the disc upper and lower surfaces 50 and 51 during nutation.

Extending radially outwardly to the inner surfaces of the housing side walls and received within cut-out portions in the disc 47 are a pair of separator or partition plates 52 and 53 which divide the interior of the housing into four motor chambers 54, 55, 56 and 57 when viewed both vertically and horizontally. As indicated in FIGURE 4, the numerals 54 and 56 designate the upper and lower chambers down from the divider plate, and the upper and lower chambers up from said divider are indicated at 55 and 57.

The primary object of a four chamber construction as disclosed is to permit the direction of expansible fluid or gas evenly across the entire upper and lower surfaces of the nutating disc 47 which are exposed to the expansible fluid during a particular portion of rotation of the disc. In other words, in order to substantially eliminate reaction forces on the disc during its nutating movement, fluid is directed into the chambers 55 and 56 against the upper and lower surfaces 50 and 51 of the disc substantially simultaneously, and as the disc 47 nutates by reason of the gas pressure within said chambers and is suitably exhausted, expansible fluid is then directed into the chambers 54 and 57 and against the lower and upper 51 and 50, respectively, surfaces of the disc 47. Thus, in contrast to the structure of FIGURES 1 and 2, both the upper and lower surfaces of the disc are simultaneously contacted by expansible fluid to initiate and continue the disc nutation, as will be described in more detail later.

Utilization of a four chamber construction with the necessary number of inlet and outlet ports may be accomplished with the conventional nutating disc motor wherein the flow of fluid into the chambers is controlled by an exterior valve means. However, the multichamber construction is illustrated in the drawings in connection with an inlet and inlet port arrangement generally of the same character as is shown in FIGURES 1 and 2. It will nevertheless be appreciated that the novel features of the multichamber construction in substantially eliminating reaction forces on the sphere and disc are not to be limited to the inlet and inlet port arrangement shown in FIGURES 3 and 4. Further, the exterior drive means of FIGURE 1 may or may not be required to relieve the load on the partition plates 52 and 53.

An effective inlet and inlet port arrangement provided in the disc seat and sphere may take the form shown in FIGURES 3 and 4. The bottom wall 58 of the housing 43 is bored substantially centrally thereof to provide an opening 59 communicating with a pair of generally arc-shaped inlets 60 and 61 in the lower seating surface 45 of said housing. The inlets together are of sinuous shape in plan and individually communicate sequentially or alternately during nutation of the disc with inlet ports 62 and 63 in the sphere 46. The ports may be of generally T-shape in cross-section as shown, and include leg portions 64 and arm portions 65 which communicate at opposite ends with an upper and lower surface 51 and 50 of the disc 47 and an opposite pair of motor chambers 56—55. Accordingly, during one 180° cycle of rotation of the disc, expansible fluid is flowed simultaneously against the upper surface of the disc and lower surface of the disc to effect nutation thereof.

To explain further, and with the disc in the position shown, expansible fluid enters the opening 59 in the housing bottom wall and passes through the inlet 60 and into the inlet port 62, whereupon it is directed by the arm portions 65 simultaneously to the upper surface 50 of the disc and chamber 55, and to the disc lower surface 51 and chamber 56. This initiates nutation of the disc 47, and as the gas in said chambers adiabatically expands, the nutative movement continues and ultimately the lower surface 51 of the disc contacts the housing lower surface 49 in the chamber 54 and the disc upper surface 50 mates with the housing upper surface 48 in the chamber 57. The expanded gas during said movement is ported through exhaust openings 66 in the chambers 54 and 57, each of the four chambers being provided with a single open type exhaust. Upon completion of the described 180° nutation of the disc, gas is directed through the opening 59 and into the inlet 61 and inlet port 63. It is discharged into the chambers 54 and 57 and against the lower and upper surfaces of the disc when located therein to initiate and then continue the desired disc nutation. When the 180° rotation of the disc is completed, and the adiabatically expanded gas exhausted through outlet ports 66 in the chambers 55 and 56, the disc will have returned to the position of FIGURE 3. Another phase of the cycle may then be initiated, and power again taken from the shaft 67 which extends axially from the sphere 46 through an opening 68 in the housing top wall 69.

The inlets 62 and 63 in FIGURE 4 are in one vertical plane to insure synchronization of the inlet pressures. They are displaced in the drawing for illustrative purposes. The outlets may be of the customary open port type and the working volume will accordingly be made the same as with the customary nutating disc motor provided with only a single partition plate. Should it be desired to obtain even greater power from the motor and utilize an increased volume, outlet valves may be employed which will open the outlet ports 270° after inlet of fluid is started, in contrast to the 180° opening when employing the well known open port construction. Such an outlet valve arrangement provides with a two partition motor approximately 1.66 times larger volume and therefore 1.66 more power. It may be seen therefore that for the same power output the motor can be substantially lighter and smaller than has heretofore been thought possible. The use of outlet valves has the further advantage, in combination with the construction herein described, of being self starting without adiabatic expansion and with the expansion of the volume ratio less than 1.66 depending upon the specific gas employed.

It has been further found by applicant that substantial increases in the performance of both one and two divider plate motors may be obtained by the use of seal means which essentially entirely eliminate leakage between the divider and the nutating disc. While improvement of a noticeable magnitude results from employment of a seal in a one divider motor, by reducing if not eliminating sidewise adjusting minute motion of the disc and decreasing markedly surface stresses of the disc cutout on the divider plate, even greater performance advances are obtained with a divider-disc seal in a two divider motor.

To explain, in a one divider plate motor the forward side of the divider, considered in the direction of nutation, normally has high pressure and the back side low pressure. A pressure differential of substantial magnitude arises normally only if a higher degree of adiabatic expansion is used. The two divider nutating disc motor, on the other hand, is characterized by a relatively large pressure differential on the upper and lower portions of the same divider plate. Since the customary disc cutout in the divider, as in conventional water meters, requires certain minimum clearances between the disc and divider plate, it is apparent that leakage is bound to occur.

An arrangement of novel character which effectively prevents such leakage is shown in FIGURES 5 through 8, and reference is now made thereto. An essentially circular housing 70 is provided interiorly with upper and lower seating surfaces 71 and 72, respectively, supporting a sphere 73 upon which is carried a substantially circular disc 74 for nutating movement within said housing. Upper and lower surfaces 75 and 76 are formed on the housing interior and said surfaces mate with upper and lower surfaces 77 and 78 of the disc.

A pair of divider or partition plates 79 (only one being shown) extend radially outwardly to the inner surfaces of the housing side walls to divide the housing interior into four motor chambers 80, 81, 82 and 83, as shown in FIGURE 6. Located between the disc 74 and each partition plate 79 is a pair of seal members 84 and 85 of essentially cylindrical segmental configuration. Movement of the seal members during nutation of the disc is prevented by a relatively close fitting contact between the generally flat face 86 of each seal member and the divider face 87, as well as contact between the concave surfaces 88 of the disc and the cylindrical face 89 of each seal member. To accommodate the segmental seals 84 and 85 during disc nutation, the upper and lower walls of the housing interior are provided with grooves or channels 90.

The curvature of the cylindrical surface or face 89 of the seal members is created by the radii drawn from the middle line of the divider plates 79 to opposite corners of the generally spherical ends 91 and 92 of each seal member. When so constructed and arranged, the segments or seal members 84 and 85 effectively reduce to a marked degree divider plate leakage by virtue of the rotating component of nutation being taken by the cylindrical surfaces 89 of the seals and the up and down movement by the flat face 86 thereof.

As previously stated, it is not required in the effective utilization of the novel principles of this invention that the nutating disc motor be provided with the differential gearing arrangement of FIGURE 1, nor that the inlet and inlet port integral with the sphere and sphere seat be used in the four chamber construction. It will be further appreciated that other modifications can be made in the structures herein disclosed without departing from the spirit of the invention or the scope of the appended claims.

I claim as my invention:

1. A motor driven by an expansible fluid comprising a housing, a nutating disc located within the housing and adapted to be driven by said fluid, a sphere supporting the disc, a seat carried within the housing and receiving the sphere therein, a plurality of inlets in the seat, and a plurality of inlet ports in the sphere communicating with said inlets during nutation of the disc.

2. A motor driven by an expansible fluid, which comprises a housing, spherically shaped seats supported by said housing interiorly thereof, a sphere located within the housing and received in said seats, a disc having an opening generally centrally thereof carried by the sphere and adapted to be driven by the fluid, and passageways in the housing and sphere terminating on the upper and lower surfaces of the disc to carry fluid to said surfaces and cause nutation of the disc.

3. A motor driven by an expansible fluid, which comprises a housing and at least one chamber interiorly of said housing, seating surfaces in said chamber carried by opposite walls of the housing, a nutating disc located within the chamber to be driven by expanding fluid, a generally spherically shaped member carried between the seating surfaces and supporting the disc for nutation within the chamber, inlet passageways in the housing bottom wall and spherically shaped member communicating with opposite surfaces of the disc to carry fluid to said surfaces and cause nutation of the disc, and outlet passageways in the housing to receive expansible fluid during nutation of the disc within the chamber.

4. A nutating disc motor adapted to be driven by an expansible fluid, which comprises a housing, shaped seating surfaces carried by said housing interiorly thereof, a generally ball-shaped member received in said surfaces for rotation thereon, a nutating disc supported by said member for movement within the housing, a pair of generally arc-shaped openings in one of said seating surfaces, and inlet passageways in the ball-shaped member communicating with the arc-shaped openings in the seating surfaces and with opposite surfaces of the disc during nutative movement thereof.

5. A nutating disc motor adapted to be driven by an expansible fluid, which comprises a housing, shaped seating surfaces carried by said housing interiorly thereof, a generally ball-shaped member received in said surfaces for rotation thereon, a nutating disc supported by said member for movement within the housing, a pair of generally arc-shaped openings in one of the seating surfaces, and a pair of inlet passageways in the ball-shaped member communicating at one end alternately with the arc-shaped openings in the seating surfaces and at the other end with the upper and lower surfaces of the nutating disc during movement thereof.

6. A nutating disc motor adapted to be driven by an expansible fluid, which comprises a housing, shaped seating surfaces carried interiorly of the housing along the top and bottom walls thereof, a spheroid received in said seating surfaces, a nutating disc having an opening generally centrally thereof surrounding the spheroid, exhaust fluid passageways in the housing, a pair of generally arc-shaped openings in the lower seating surface passing at one end through the bottom wall of the housing, and a pair of inlet passageways in the spheroid communicating at one end alternately with the opposite end of the arc-shaped openings and at their opposite ends with the upper and lower surfaces of the nutating disc.

7. A nutating disc motor adapted to be driven by an expansible fluid, which comprises a housing, shaped seating surfaces carried interiorly of the housing along the top and bottom walls thereof, a spheroid received in said seating surfaces, a nutating disc having an opening generally centrally thereof surrounding the spheroid, exhaust fluid passageways in the housing, a pair of curved connecting opening in the lower seating surface terminating at one end exteriorly of the housing, and a pair of spaced inlet passageways in the spheroid communicating at one end alternately with the opposite ends of the curved openings in the seating surface and terminating at their opposite ends along the upper and lower surfaces of the nutating disc.

8. A nutating disc motor adapted to be driven by an expansible fluid, which comprises a housing, a shaped seating surface supported within said housing and having a generally S-shaped opening communicating with spaced holes in the housing, a spherically-shaped member rotatable upon said seating surface and provided with a pair of spaced inlet passageways communicating at one end with the S-shaped opening in the seating surface and spaced holes in the housing, and a nutating disc carried by the spherically-shaped member and having openings in the upper and lower surfaces thereof communicating alternately with the inlet passageways in the sphere.

9. A nutating disc motor to be driven by an expansible fluid which comprises a housing, shaped seating surfaces located interiorly of the housing, a spherically shaped member carried by said seating surfaces, a nutating disc supported on said spherically shaped member, divider members extending radially inwardly from the housing inner walls and providing with said disc a plurality of motor compartments within the housing, exhaust passageways communicating with each of said compartments, a pair of generally arc-shaped inlet openings in one of the seating surfaces, and a pair of inlet passageways in the spherically shaped member communicating alternately with one of the pair of arc-shaped openings and with the upper and lower surface of the disc when positioned in an opposed pair of motor compartments.

10. A nutating disc motor which comprises a housing having inlet and outlet passageways therein, a first seating surface in said housing, a seating surface in said housing opposed to said first seating surface and provided with inlet passages arranged to communicate with the inlet passageway in the housing, a shaped member carried by said seating surfaces and having passages communicating with the inlet passages in said second seating surface, a disc supported by said shaped member for nutating movement within said housing, said passages in the shaped member further communicating with opposite surfaces of the disc, a shaft extending axially from the disc, a gear fixedly secured to said shaft, a gear on said shaft freely rotatable thereon, a pair of gears meshing with the gears of the shaft, and a stationary gear meshing with said freely rotatable gear, the ratio of the gears being such that the rotation of the fixed gear on the shaft about its own axis is essentially zero.

11. A nutating disc motor to be driven by an expansible fluid which comprises a housing, opposed seating surfaces supported within said housing, one of the seating surfaces being formed with inlet passages therein, a generally spherical member carried by said seating surfaces and having passages communicating with the inlet passages in said one seating surface, a nutating disc supported by said spherical member, divider members extending radially inwardly from the housing walls and providing with said disc a plurality of motor compartments within the housing, an exhaust passageway in the housing communicating with each of said motor compartments, and an inlet passageway in the housing in communication with each of the compartments through the inlet passages in said one seating surface and through the passages in the generally spherical member.

12. A nutating disc motor to be driven by an expansible fluid which comprises a housing, opposed seating surfaces supported within said housing, one of the seating surfaces being formed with inlet passages therein, a generally ball-shaped member carried by said seating surfaces and having passages communicating with the passages in said one seating surface, a nutating disc supported by said ball-shaped member, divider members extending radially inwardly from the housing inner walls and providing with said disc a plurality of motor compartments within the housing, inlet passages in the housing communicating with each of said motor compartments through the inlet passages in said one seating surface and through the passages in the ball-shaped member, and with the upper and lower surfaces of the disc to simultaneously direct expansible fluid to said surfaces while nutating within an opposed pair of said compartments, and exhaust passageways in said housing communicating with each of the motor compartments.

13. A nutating disc motor to be driven by an expansible fluid which comprises a housing, opposed seating surfaces supported within said housing, one of the seating surfaces being formed with inlet passages therein, a shaped member carried by said seating surfaces and having passages communicating with the passages in said one seating surface, a nutating disc mounted by said shaped member, divider members extending radially inwardly from the housing inner walls and providing with said disc a plurality of motor compartments within the housing, an exhaust passageway in the housing communicating with each of said motor compartments, an inlet passageway in the housing in communication with each of the compartments through the inlet passages in said one seating surface and through the passages in said shaped member, and seal means between the nutating disc and each of the divider members.

14. A nutating disc motor to be driven by an expansible fluid which comprises a housing, opposed seating surfaces supported within said housing, one of the seating surfaces being formed with inlet passages therein, a generally spherical member carried by said seating surfaces and having passages communicating with the inlet passages in said one seating surface, a nutating disc supported by said generally spherical member, divider members extending radially inwardly from the housing inner walls and providing with said disc a plurality of motor compartments within the housing, an exhaust passageway in the housing communicting with each of said motor compartments, an inlet passageway in the housing in communication with each of the compartments through the inlet passages in said one seating surface and through the passages in said generally spherical member, and a pair of semi-cylindrical sealing members between the nutating disc and each of the divider members in close contact therewith and preventing fluid leakage between the disc and divider members during nutation of the disc.

15. A nutating disc motor adapted to be driven by an expansible fluid, which comprises a housing, a pair of opposed seating surfaces supported within the housing, one of said seating surfaces being formed with inlet passages therein, a generally ball-shaped passaged member carried by said seating surfaces, a nutating disc supported by said ball-shaped member, inlet passageways in the housing communicating with opposite surfaces of the disc by means of the passages in said one seating surface and by means of the passages in said ball-shaped member, exhaust passageways in said housing, a shaft member carried by the ball-shaped member, and drive means connected to said shaft to substantially eliminate sidewise movement of the disc during nutation thereof.

16. A nutating disc motor adapted to be driven by an expansible fluid, which comprises a housing, a pair of opposed seating surfaces supported within the housing, one of said seating surfaces being formed with inlet passages therein, a generally ball-shaped passaged member carried by said seating surfaces, a nutating disc supported by said ball-shaped member, inlet passageways in the housing communicating with opposite surfaces of the disc by means of the passages in said one seating surface and by means of the passages in said ball-shaped member, exhaust passageways in said housing, a partition member dividing the interior of the housing into a high pressure zone and a low pressure zone, a shaft member carried by the ball-shaped member, and drive means connected to said shaft to substantially eliminate sidewise movement of the disc when the angle between the partition member and disc is at a minimum during nutation of the disc.

References Cited in the file of this patent
UNITED STATES PATENTS

| | | |
|---|---|---|
| 263,573 | Patten | Aug. 29, 1882 |
| 660,383 | Lambert | Oct. 23, 1900 |
| 714,823 | Samain | Dec. 2, 1902 |
| 790,264 | Roseland | May 16, 1905 |
| 2,031,126 | Peschl | Feb. 18, 1936 |